(12) United States Patent
Ikeda et al.

(10) Patent No.: US 11,641,025 B2
(45) Date of Patent: May 2, 2023

(54) METHOD FOR MANUFACTURING ALL-SOLID-STATE BATTERY

(71) Applicant: TOYOTA JIDOSHA KABUSHIKI KAISHA, Toyota (JP)

(72) Inventors: Yusuke Ikeda, Nisshin (JP); Masato Ono, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 270 days.

(21) Appl. No.: 17/148,971

(22) Filed: Jan. 14, 2021

(65) Prior Publication Data

US 2021/0280897 A1 Sep. 9, 2021

(30) Foreign Application Priority Data

Mar. 5, 2020 (JP) .............................. JP2020-037928

(51) Int. Cl.
| | |
|---|---|
| *H01M 10/04* | (2006.01) |
| *H01M 10/61* | (2014.01) |
| *H01M 10/613* | (2014.01) |
| *H01M 10/0562* | (2010.01) |

(52) U.S. Cl.
CPC ... *H01M 10/0468* (2013.01); *H01M 10/0413* (2013.01); *H01M 10/0562* (2013.01); *H01M 10/613* (2015.04)

(58) Field of Classification Search
CPC .... H01M 10/04; H01M 10/60; H01M 10/613; H01M 10/45
See application file for complete search history.

(56) References Cited

U.S. PATENT DOCUMENTS

| | | | | |
|---|---|---|---|---|
| 2012/0308878 | A1* | 12/2012 | Sakashita | .......... H01M 10/0468 429/185 |
| 2014/0363730 | A1* | 12/2014 | Ochiai | .................... B29C 49/00 264/544 |
| 2015/0188195 | A1 | 7/2015 | Matsushita | |
| 2019/0051935 | A1 | 2/2019 | Okamoto et al. | |

FOREIGN PATENT DOCUMENTS

| | | |
|---|---|---|
| JP | 2015008073 A | 1/2015 |
| JP | 2015125872 A | 7/2015 |
| JP | 2016134254 A | 7/2016 |
| JP | 2017183121 A | 10/2017 |
| JP | 2018147621 A | 9/2018 |
| KR | 20150076103 A | 7/2015 |

* cited by examiner

*Primary Examiner* — Kenneth J Douyette
(74) *Attorney, Agent, or Firm* — Dickinson Wright, PLLC

(57) ABSTRACT

A method for manufacturing an all-solid-state battery includes a battery unit producing step, a flattening step, and a stacking step. In the battery unit producing step, a battery unit having a plate shape is produced through a pressing step in which a laminate including at least one each of a positive electrode active material layer, a solid electrolyte layer, and a negative electrode active material layer is pressed in a thickness direction of the laminate with a first pressure. In the flattening step, the battery unit is flattened by pressing the produced battery unit in the thickness direction with a second pressure equal to or lower than the first pressure while heating the battery unit to a temperature equal to or higher than a temperature at which the battery unit softens and is deformed. In the stacking step, a plurality of the flattened battery units are stacked.

2 Claims, 2 Drawing Sheets

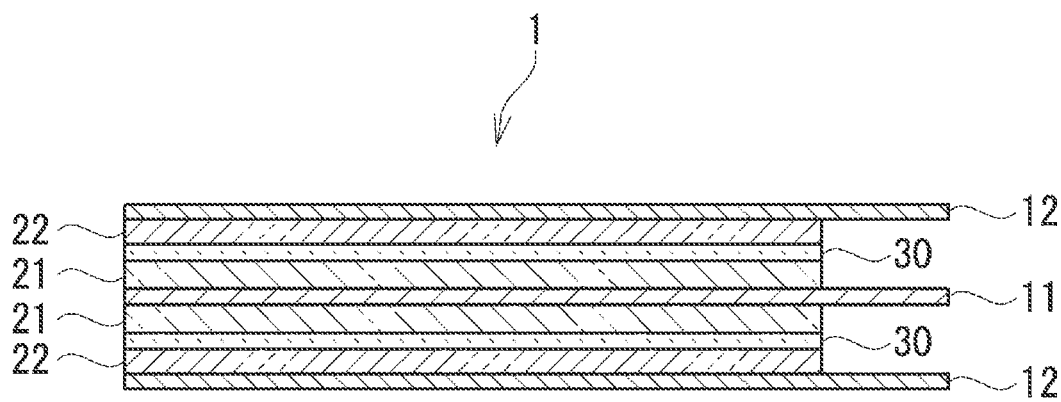
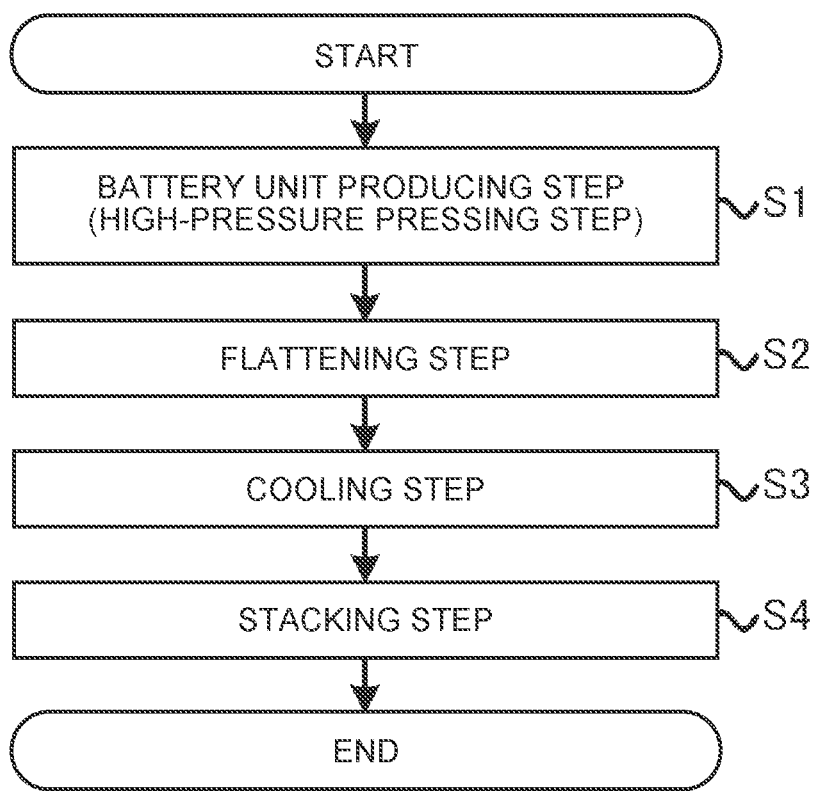

METHOD FOR MANUFACTURING ALL-SOLID-STATE BATTERY

CROSS-REFERENCE TO RELATED APPLICATION

This application claims priority to Japanese Patent Application No. 2020-037928 filed on Mar. 5, 2020, incorporated herein by reference in its entirety.

BACKGROUND

1. Technical Field

The present disclosure relates to a method for manufacturing an all-solid-state battery.

2. Description of Related Art

Secondary batteries are widely used as portable power sources for personal computers, mobile terminals, etc. or as vehicle drive power sources for electric vehicles (EVs), hybrid vehicles (HVs), plug-in hybrid vehicles (PHVs), and the like. As an example of the secondary batteries, development of an all-solid-state battery using a solid electrolyte instead of a liquid electrolyte is underway. For example, in the method for manufacturing an all-solid-state battery described in Japanese Unexamined Patent Application Publication No. 2015-8073 (JP 2015-8073 A), a laminate is obtained by stacking a plurality of layers such that a solid electrolyte layer is sandwiched between a layer containing a negative electrode active material and a layer containing a positive electrode active material. After that, the laminate is subjected to heat pressing.

SUMMARY

An all-solid-state battery may be manufactured by stacking a plurality of battery units after producing a battery unit containing at least one each of a positive electrode active material layer, a solid electrolyte, and a negative electrode active material layer. Here, each battery unit is manufactured through a process of pressing the battery unit at high pressure in the thickness direction. By pressing at least a part of the battery unit at high pressure, the powder and each layer are brought into close contact with each other. However, when the pressing is released, waviness may occur in the produced battery unit due to an influence of non-uniformity of gaps reduced by the pressing. When the battery units having waviness are stacked, the battery units are less likely to be stacked normally. As a result, deterioration of the battery performance and the like may occur.

The present disclosure provides a method for manufacturing an all-solid-state battery. The method suppresses an influence of waviness of a battery unit and allows a plurality of the battery units to be stacked appropriately.

A method for manufacturing an all-solid-state battery according to an aspect of the disclosure includes: a battery unit producing step of producing a battery unit having a plate shape, through a pressing step in which a laminate including at least one each of a positive electrode active material layer, a solid electrolyte layer, and a negative electrode active material layer is pressed in a thickness direction of the laminate with a first pressure; a flattening step of flattening the battery unit by pressing the produced battery unit in the thickness direction with a second pressure equal to or lower than the first pressure while heating the battery unit to a temperature equal to or higher than a temperature at which the battery unit softens and is deformed; and a stacking step of stacking a plurality of the battery units that have been flattened.

The first pressure in the pressing (hereinafter referred to as "high-pressure pressing") in the battery unit producing step is set to such a pressure that powder in the laminate has an appropriate density. In the flattening step in the present disclosure, the battery unit is pressed with the second pressure equal to or lower than the first pressure during the high-pressure pressing. Therefore, unlike the case where the pressing in the flattening step is performed with a pressure higher than the first pressure during the high-pressure pressing, the battery unit is appropriately flattened in a state where changes in the electrode structure in the battery unit are suppressed. Further, in the flattening step in the present disclosure, the battery unit is pressed in the thickness direction at the temperature equal to or higher than the temperature at which the battery unit softens and is deformed. Therefore, for example, unlike the case where the battery unit is pressed at a temperature lower than the temperature at which a binder (binding material) contained in the battery unit softens and is deformed, the shape of the battery unit is less likely to return to its original shape after the pressing is released. Thus, through the flattening step, the waviness of each battery unit is reduced. The battery units are stacked thereafter, so that it becomes easy to appropriately secure the facing area between the adjacent battery units. Thus, deterioration of performance of the all-solid-state battery and the like are less likely to occur.

The method further may include a cooling step of cooling the battery unit heated and pressed in the flattening step while maintaining the battery unit in a pressed state. In this case, a springback phenomenon caused by the release of pressing with the battery unit being heated is less likely to occur. Thus, each battery unit is more appropriately flattened.

The cooling step may be performed by cooling the battery unit with the battery unit being compressed and transferred by a press conveyor. In this case, it is not necessary to stop the movement of the battery unit during the cooling step, so the production efficiency is improved.

The second pressure for pressing the battery unit in the flattening step may be 0.0005 MPa or higher and 1500 MPa or lower. By setting the second pressure to 1500 MPa or lower, changes in the electrode structure in the battery unit are appropriately suppressed. Further, by setting the second pressure to 0.0005 MPa or higher, the battery unit is appropriately flattened.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a schematic sectional view of a battery unit 1;

FIG. 2 is a flowchart showing an example of a method for manufacturing an all-solid-state battery;

DETAILED DESCRIPTION OF EMBODIMENTS

Figure 3:
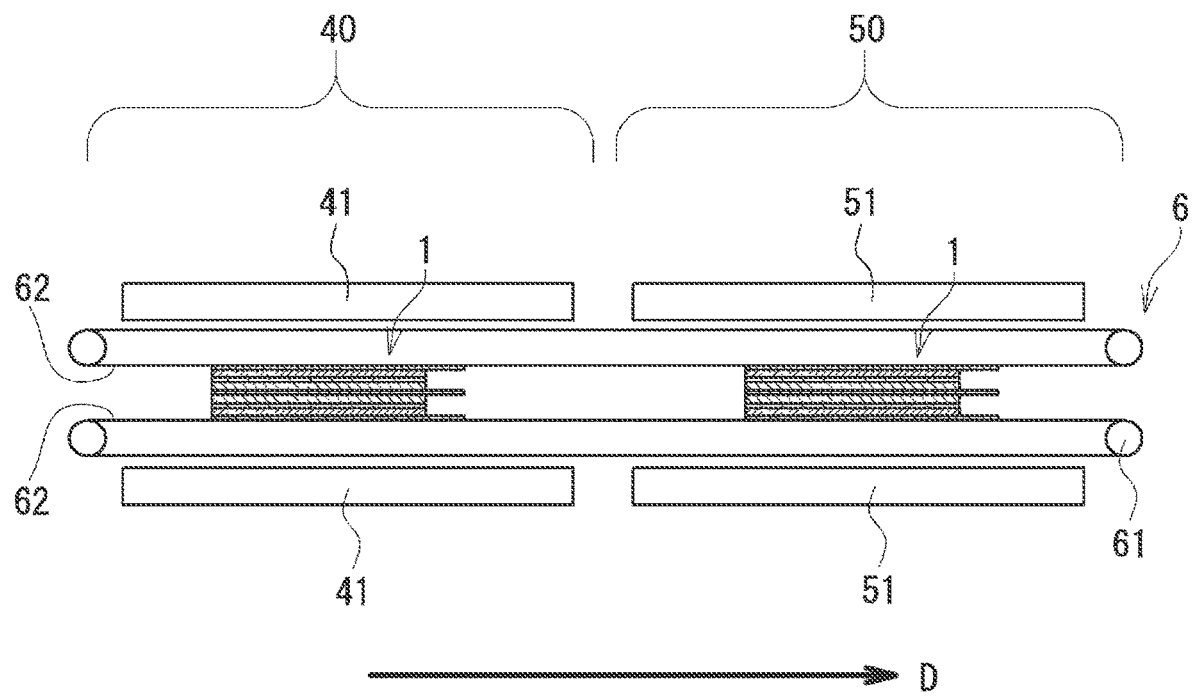
FIG. 3 is a side view of a heating flattening unit 40 and a cooling unit 50 in the present embodiment.

Hereinafter, one typical embodiment in the present disclosure will be described in detail with reference to the drawings. Matters other than those specifically mentioned in the present specification and necessary for implementation (for example, the configuration of an all-solid-state battery) can be grasped as design matters of a person skilled in the art based on the related art of the technical field. The disclosure can be carried out based on content disclosed in the present specification and common knowledge in the technical field. In the following drawings, the same reference signs are given to the members and portions that have the same effect. The dimensional relationships (length, width, thickness, etc.) in the drawings do not show the actual dimensional relationships.

First, a schematic configuration of an all-solid-state lithium ion secondary battery (hereinafter, may be simply referred to as "all-solid-state battery"), which is an example of an all-solid-state battery manufactured by the manufacturing method exemplified in the present disclosure, will be described. However, the all-solid-state battery to which the manufacturing method in the present disclosure is applied is not limited to the all-solid-state lithium ion secondary battery. That is, the all-solid-state battery may be one that includes a metal ion other than lithium ion as a charge carrier, for example, a sodium ion secondary battery, a magnesium ion secondary battery, or the like.

The battery unit 1 constituting the all-solid-state battery will be described with reference to FIG. 1. The all-solid-state battery in the present disclosure is manufactured by stacking the plurality of battery units 1 illustrated in FIG. 1. The battery unit 1 illustrated in FIG. 1 includes a first current collector 11, a first active material layer 21, a solid electrolyte layer 30, a second active material layer 22, and a second current collector 12. Each of the first current collector 11 and the second current collector 12 is either a positive electrode current collector or a negative electrode current collector. When the first current collector 11 is the positive electrode current collector, the second current collector 12 is the negative electrode current collector. When the first current collector 11 is the negative electrode current collector, the second current collector 12 is the positive electrode current collector. Further, each of the first active material layer 21 and the second active material layer 22 is either a positive electrode active material layer or a negative electrode active material layer. When the first current collector 11 is the positive electrode current collector and the first active material layer 21 is the positive electrode active material layer, the second active material layer 22 is the negative electrode active material layer. When the first current collector 11 is the negative electrode current collector and the first active material layer 21 is the negative electrode active material layer, the second active material layer 22 is the positive electrode active material layer.

In the battery unit 1 of the present embodiment, the first active material layer 21, the solid electrolyte layer 30, the second active material layer 22, and the second current collector 12 are stacked in this order on both sides of the sheet-shaped first current collector 11. However, the first active material layer 21, the solid electrolyte layer 30, the second active material layer 22, and the second current collector 12 may be stacked in this order on one side of the first current collector 11.

The solid electrolyte layer 30 contains at least a solid electrolyte. Examples of the solid electrolyte include a sulfide-based solid electrolyte and an oxide-based solid electrolyte. Examples of the sulfide-based solid electrolyte include $Li_2S$—$SiS_2$-based, $Li_2S$—$P_2S_3$-based, $Li_2S$—$P_2S_5$-based, $Li_2S$—$GeS_2$-based $Li_2S$—$B_2S_3$-based glass or glass ceramics. Examples of the oxide-based electrolyte include various oxides having a Na super ionic conductor (NASICON) structure, a garnet structure, or a perovskite structure. The solid electrolyte is, for example, in the form of particles. The solid electrolyte layer 30 contains a binder (binding material) such as butadiene rubber.

The positive electrode active material layer contains at least the positive electrode active material. The positive electrode active material layer preferably further contains a solid electrolyte, and may further contain a conductive material, a binder, and the like. As the conductive material of the positive electrode active material layer, for example, a known conductive material such as VGCF (registered trademark) and acetylene black can be used. For the binder of the positive electrode active material layer, for example, a fluorine-containing resin such as polyvinylidene fluoride can be used. As the positive electrode active material, various compounds conventionally used in this type of battery can be used. Examples of the positive electrode active material include layered composite oxides such as $LiCoO_2$ and $LiNiO_2$, spinel-structured composite oxides such as $Li_2NiMn_3O_8$ and $LiMn_2O_4$, and olivine-structured composite compounds such as $LiFePO_4$. As the solid electrolyte in the positive electrode active material layer, the same kind of material as the solid electrolyte contained in the solid electrolyte layer 30 can be used. The positive electrode active material is, for example, in the form of particles.

The negative electrode active material layer contains at least the negative electrode active material. The negative electrode active material layer preferably further contains a solid electrolyte, and may further contain a conductive material, a binder, and the like. As the conductive material of the negative electrode active material layer, for example, a known conductive material such as acetylene black can be used. For the binder of the negative electrode active material layer, for example, a fluorine-containing resin such as polyvinylidene fluoride can be used. As the negative electrode active material, various compounds conventionally used in this type of battery can be used. Examples of the negative electrode active material include carbon-based negative electrode active materials such as graphite, mesocarbon microbeads, and carbon black. Further, examples of the negative electrode active material include a negative electrode active material containing silicon (Si) or tin (Sn) as a constituent element. As the solid electrolyte in the negative electrode active material layer, the same kind of material as the solid electrolyte contained in the solid electrolyte layer 30 can be used. The negative electrode active material is, for example, in the form of particles.

As the positive electrode current collector, those used as the positive electrode current collector of this type of battery can be used without particular limitation. Typically, the positive electrode current collector is preferably made of a metal having good conductivity. The positive electrode current collector may be made of a metal material such as aluminum, nickel, chromium, gold, platinum, titanium, zinc, and stainless steel. As the negative electrode current collector, those used as the negative electrode current collector of this type of battery can be used without particular limitation. Typically, the negative electrode current collector is preferably made of a metal having good conductivity. As the negative electrode current collector, for example, copper (copper foil), a copper-dominant alloy, aluminum, nickel, iron, titanium, zinc, and the like can be used.

The method for manufacturing an all-solid-state battery in the present embodiment will be described with reference to FIGS. 2 and 3. As shown in FIG. 2, the method for manufacturing an all-solid-state battery exemplified in the present embodiment includes a battery unit producing step (S1), a flattening step (S2), a cooling step (S3), and a stacking step (S4).

In the battery unit producing step (S1), a laminate including at least one each of the positive electrode active material layer, the solid electrolyte layer, and the negative electrode active material layer is pressed at high pressure in the thickness direction, so that the battery unit 1 having a plate shape (see FIG. 1) is produced. A step of pressing the laminate in the battery unit producing step is hereinafter referred to as a high-pressure pressing step.

An example of the battery unit producing step will be described in detail. First, the first active material layer 21 is disposed on both sides of the first current collector 11. As a method of disposing the first active material layer 21 on the first current collector 11, a slurry coating process, a blast method, an aerosol deposition method, a cold spray method, a sputtering method, a chemical vapor deposition method, a thermal spraying method, or the like can be used. For example, in the slurry coating process, a slurry containing the active material contained in the first active material layer 21 is prepared, and the prepared slurry is applied to the surface of the first current collector 11 and dried. Further, the prepared slurry may be applied to a base material and dried to form a first active material film on the base material, and the formed first active material film may be transferred from the base material to the first current collector 11 by pressing so that the first active material layer 21 is disposed.

Next, the solid electrolyte layer 30 is disposed on the surface of each first active material layer 21 disposed on both sides of the first current collector 11. For example, a slurry containing a solid electrolyte may be applied to the base material and dried to form a solid electrolyte film on the base material, and the formed solid electrolyte film may be transferred to the surface of the first active material layer 21 so that the solid electrolyte layer 30 is disposed.

Next, a layer including the second active material layer 22 and the second current collector 12 is disposed on the surface of each solid electrolyte layer 30 such that the second active material layer 22 is in contact with the solid electrolyte layer 30. As a method of disposing the second active material layer 22 on the solid electrolyte layer 30, various methods can be used in the same manner as the method of disposing the first active material layer 21 on the first current collector 11. The second active material layer 22 may be disposed on the solid electrolyte layer 30 after the second active material layer 22 is disposed on the second current collector 12. Further, the second current collector 12 may be disposed on the surface of the second active material layer 22 after the second active material layer 22 is disposed on the solid electrolyte layer 30.

Next, a laminate in which the second current collector 12, the second active material layer 22, the solid electrolyte layer 30, the first active material layer 21, the first current collector 11, the first active material layer 21, the solid electrolyte layer 30, the second active material layer 22, and the second current collector 12 are stacked in this order is pressed in the thickness direction with a high pressure (pressure P1). Thus, the battery unit 1 having a plate shape is produced. By performing the high-pressure pressing step, powders of the solid electrolyte contained in the laminate as well as the layers are brought into close contact with each other, and the voids are reduced. The high-pressure pressing step is sometimes referred to as a densification pressing step.

The pressure P1 in the high-pressure pressing may be appropriately set so that the powder in the battery unit 1 is densified to an appropriate density and the layers are in close contact with each other. In the present embodiment, the pressure P1 is set to 50 MPa to 1500 MPa. Further, as the high-pressure pressing method, for example, various methods such as uniaxial pressing, cold isostatic pressing, mechanical pressing, and gas pressurization pressing can be used.

Needless to say, the battery unit producing step described above is merely an example. For example, it is possible to change the timing and the number of times the high-pressure pressing step is performed.

When the pressing of the battery unit 1 by the high-pressure pressing step is released, waviness may occur in the produced battery unit 1 due to the non-uniformity of the gaps reduced by the high-pressure pressing, etc. The flattening step (S2) and the cooling step (S3) described below are performed in order to suppress the influence of the waviness of the battery unit 1.

In the flattening step (S2), the battery unit 1 produced in the battery unit producing step (S1) (battery unit 1 released from the pressing of the high-pressure pressing step) is pressed in the thickness direction with a pressure P2, with the battery unit 1 heated to a temperature equal to or higher than a softening deformation temperature T described later. As a result, the waviness of the battery unit 1 is reduced, and the battery unit 1 is flattened.

The flattening step is performed in a state where the temperature of the battery unit 1 is adjusted to a temperature equal to or higher than the softening deformation temperature T at which the battery unit 1 softens and is deformed. Typically, the flattening step is performed in a state where the temperature of the battery unit 1 is adjusted to a temperature equal to or higher than a softening deformation temperature at which the binder contained in the battery unit 1 softens and is deformed. That is, the temperature of the battery unit 1 during the flattening step is set to a temperature at which at least a part of the materials of the battery unit 1 softens (preferably liquefies). Thus, unlike the case where the flattening step is performed at a temperature lower than the softening deformation temperature T, the shape of the battery unit 1 is less likely to return to its original shape after the pressing is released. In the present embodiment, the softening deformation temperature T is set to 100° C. based on the result of the evaluation test (see FIG. 4) described later. Therefore, the flattening step of the present embodiment is performed in a state where the temperature of the battery unit 1 is adjusted to 100° C. or higher (for example, 170° C.±10° C.).

The pressure P2 of the pressing in the flattening step is adjusted to a pressure equal to or lower than the pressure P1 of the high-pressure pressing described above. Thus, unlike the case where the pressing during the flattening step is performed at a pressure higher than the pressure P1 during the high-pressure pressing, the battery unit 1 is appropriately flattened in a state where changes in the electrode structure in the battery unit 1 are suppressed. As described above, the pressure P1 of the high-pressure pressing is set to 1500 MPa. Therefore, the pressure P2 is set to 1500 MPa or lower.

Further, the pressure P2 of the pressing in the flattening step is set to a pressure equal to or higher than the pressure at which the waviness generated in the battery unit 1 is reduced. Experiments have shown that the waviness of the battery unit 1 of the present embodiment is reduced by pressing at a pressure of 0.0005 MPa or higher. Thus, the pressure P2 is set to 0.0005 MPa or higher.

The method of pressing the battery unit 1 in the thickness direction while heating the battery unit 1 in the flattening step can be appropriately selected. As an example, in the present embodiment, the flattening step is performed by a heating flattening unit 40 including a press conveyor (belt-type press conveyor) 6 and a heating unit (for example, a heater etc.) 41, as shown in FIG. 3. In the press conveyor 6, the battery unit 1 is disposed between a pair of belts 62 rotated by rollers 61, so that the battery unit 1 is transferred in a transfer direction (direction of an arrow D in FIG. 3) while being pressed in the thickness direction. The heating unit 41 is disposed in the heating flattening unit 40 (in the present embodiment, on both sides of the transferred battery unit 1 in the thickness direction), and heats the battery unit 1 located in the heating flattening unit 40. However, it is also possible to change at least one of the heating method and the pressing method of the battery unit 1. For example, the battery unit 1 may be heated by an oven or the like. Further, the pressing of the battery unit 1 in the flattening step may be performed by uniaxial pressing, cold isostatic pressing, mechanical pressing, gas pressurization pressing or the like.

In the cooling step (S3), the battery unit 1 heated and pressed in the flattening step (S2) is cooled while being pressed in the thickness direction. When the pressing in the flattening step is released while the battery unit 1 is being heated, a springback phenomenon occurs and the waviness becomes difficult to be reduced because the battery unit 1 is softened. In the present embodiment, however, the cooling step (S3) is performed, so that the waviness of the battery unit 1 is reduced more appropriately.

As shown in FIG. 3, in the cooling step of the present embodiment, the battery unit 1 is cooled with the battery unit 1 being compressed and transferred by the press conveyor 6. That is, the battery unit 1 is cooled during the compression transfer, by the cooling unit 50 including the press conveyor 6 and a cooling source 51. Therefore, it is not necessary to stop the movement of the battery unit 1 during the cooling step, so that the production efficiency is improved. Using the press conveyor, it is also possible to continuously perform the cooling step for the plurality of battery units 1.

Further, in the present embodiment, as shown in FIG. 3, a trailing end of the transfer path for the battery unit 1 in the heating flattening unit 40 that performs the flattening step and a starting end of the transfer path for the battery unit 1 in the cooling unit 50 that performs the cooling step are connected. Therefore, the battery unit 1 that went through the flattening step and has been transferred to the terminating end of the heating flattening unit 40 is directly transferred into the cooling unit 50 and cooled. Thus, the production efficiency of the battery unit 1 is further improved.

However, it is also possible to change the way the cooling step is performed. For example, the cooling step may be performed by disposing the battery unit 1 that went through the flattening step in a refrigerator. The cooling step may be performed by flowing gas toward the battery unit 1 using a fan or the like. Further, the cooling step may be performed by leaving the battery unit 1 pressed in the thickness direction (that is, without using a cooling source, a fan, etc.) until the temperature of the battery unit 1 heated in the flattening step drops. It is also possible to perform the flattening step and the cooling step separately, rather than perform them continuously.

In the stacking step (S4), the battery units 1 flattened in the flattening step (S2) and cooled in the cooling step (S3) are stacked in the thickness direction. The waviness of the stacked battery units 1 has been reduced in the flattening step. Therefore, the positional misalignment between the battery units 1 in the direction perpendicular to the thickness direction is suppressed, and the battery units 1 are appropriately stacked. Thus, it becomes easy to appropriately secure the facing area between the adjacent battery units 1, and deterioration of performance of the all-solid-state battery and the like are less likely to occur.

In the present embodiment, after the flattening step and the cooling step are completed, a foil is bonded to the second current collector 12 of each battery unit 1, and then the battery units 1 are stacked. Further, the stacked battery units 1 are sealed inside a laminate exterior body. The all-solid-state battery is manufactured through the above steps.

Evaluation Test

Results of the evaluation test using examples and comparative examples will be described with reference to FIG. 4. The materials, dimensions, and the like of the battery units of the comparative examples and the battery units of the examples are all the same as those of the battery unit 1 (see FIG. 1) described in the above embodiment. The flattening step (S2) and the cooling step (S3) are not performed on the battery unit of Comparative Example 1. The flattening step is performed on the battery unit of Comparative Example 2 with its temperature adjusted to 60° C. The flattening step is performed on the battery unit of Example 1 with its temperature adjusted to 100° C. The flattening step is performed on the battery unit of Example 2 with its temperature adjusted to 120° C. The pressures P2 of pressing in the flattening step performed on the battery units other than that of Comparative Example 1 were set to the same pressure. The measurement results of the amount of waviness in each battery unit are shown in FIG. 4.

Figure 4:
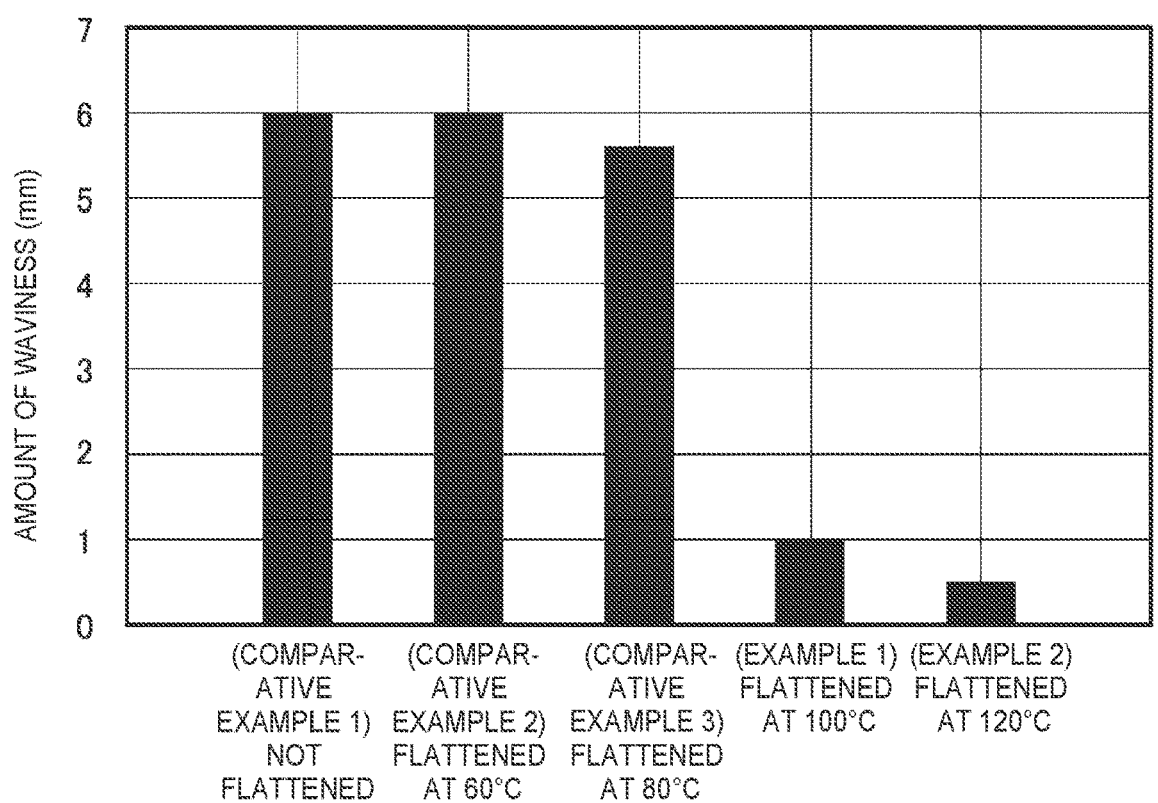
FIG. 4 is a graph showing results of an evaluation test regarding an amount of waviness of the battery unit 1.

As shown in FIG. 4, in Comparative Example 1 in which the flattening step and the cooling step were not performed, the amount of waviness was large. In Comparative Example 2 (flattened at 60° C.), the amount of waviness was almost the same as that in Comparative Example 1. In Comparative Example 3 (flattened at 80° C.), the amount of waviness was reduced as compared with Comparative Example 1 and Comparative Example 2, but the rate of reduction was small. In contrast, in Example 1 (flattened at 100° C.), the amount of waviness was significantly reduced (about ⅙) as compared with Comparative Example 1 and Comparative Example 2. In Example 2 (flattened at 120° C.), the amount of waviness was further reduced as compared with Example 1. From the above results, it can be confirmed that the waviness of the battery unit is reduced by pressing the battery unit in a state where the temperature is adjusted to an appropriate temperature. Further, it can be confirmed that by setting the temperature of the battery unit during the flattening step to 100° C. or higher, the battery unit that easily softens and is deformed is flattened and thus the waviness is appropriately reduced.

Although the specific embodiments have been described above in detail, these are merely examples. The disclosure includes various other modes in which modifications or alterations are made to the above embodiments.

What is claimed is:

1. A method for manufacturing an all-solid-state battery, the method comprising:
    a battery unit producing step of producing a battery unit having a plate shape, through a pressing step in which a laminate including at least one each of a positive electrode active material layer, a solid electrolyte layer, and a negative electrode active material layer is pressed in a thickness direction of the laminate with a first pressure;
    a flattening step of flattening the produced battery unit by pressing the produced battery unit in the thickness direction with a second pressure equal to or lower than the first pressure while heating the battery unit to a temperature equal to or higher than a temperature at which the battery unit softens and is deformed;
a stacking step of stacking a plurality of the battery units that have been flattened; and
a cooling step of cooling the battery unit heated and pressed in the flattening step while maintaining the battery unit in a pressed state;
wherein the cooling step is performed by cooling the battery unit with the battery unit being compressed and transferred by a press conveyor.

2. The method according to claim 1, wherein the second pressure for pressing the battery unit in the flattening step is 0.0005 MPa or higher and 1500 MPa or lower.

* * * * *